May 6, 1924.
R. B. RICE
1,493,053
CARD SELECTING MACHINE
Filed Oct. 21, 1922  11 Sheets-Sheet 6
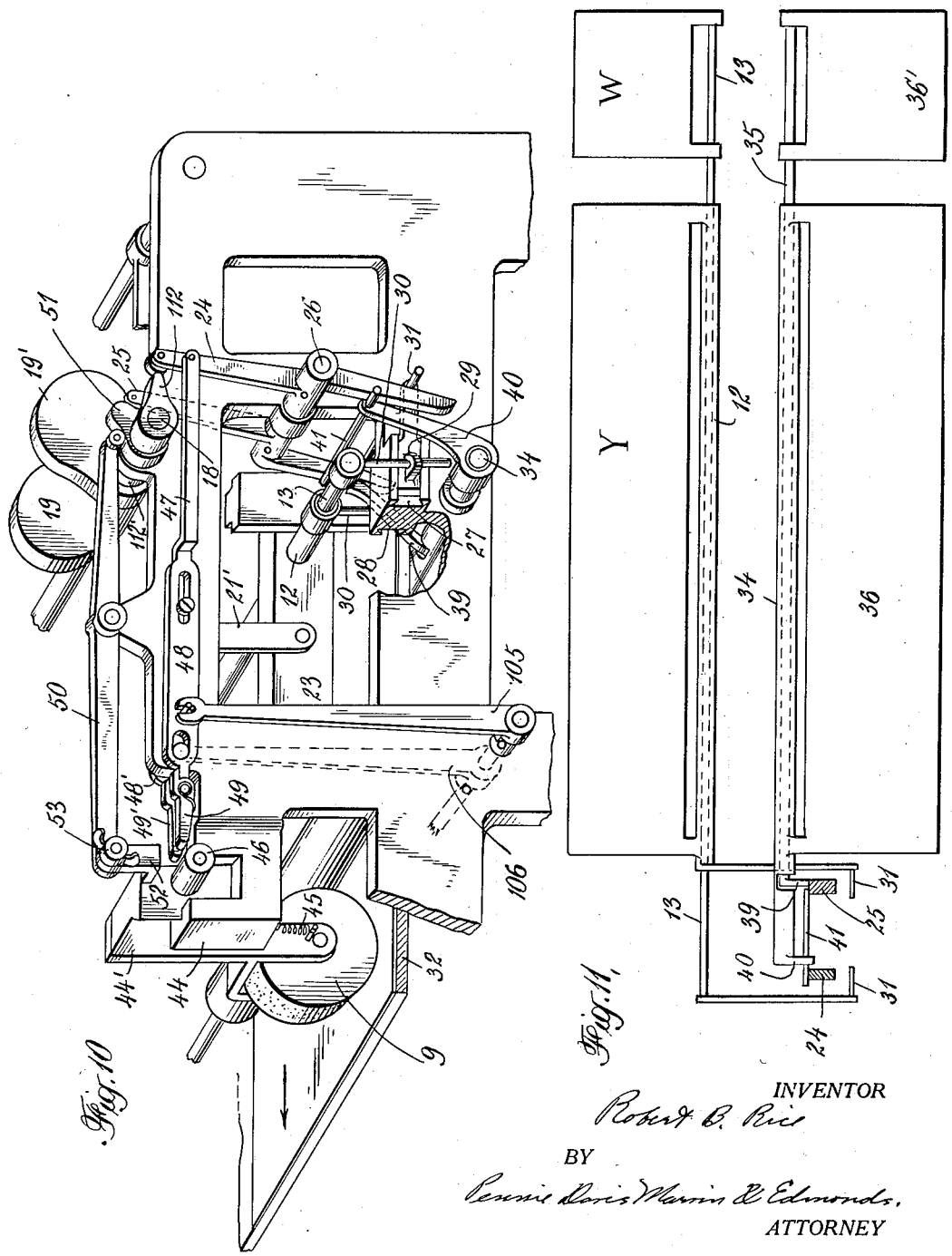

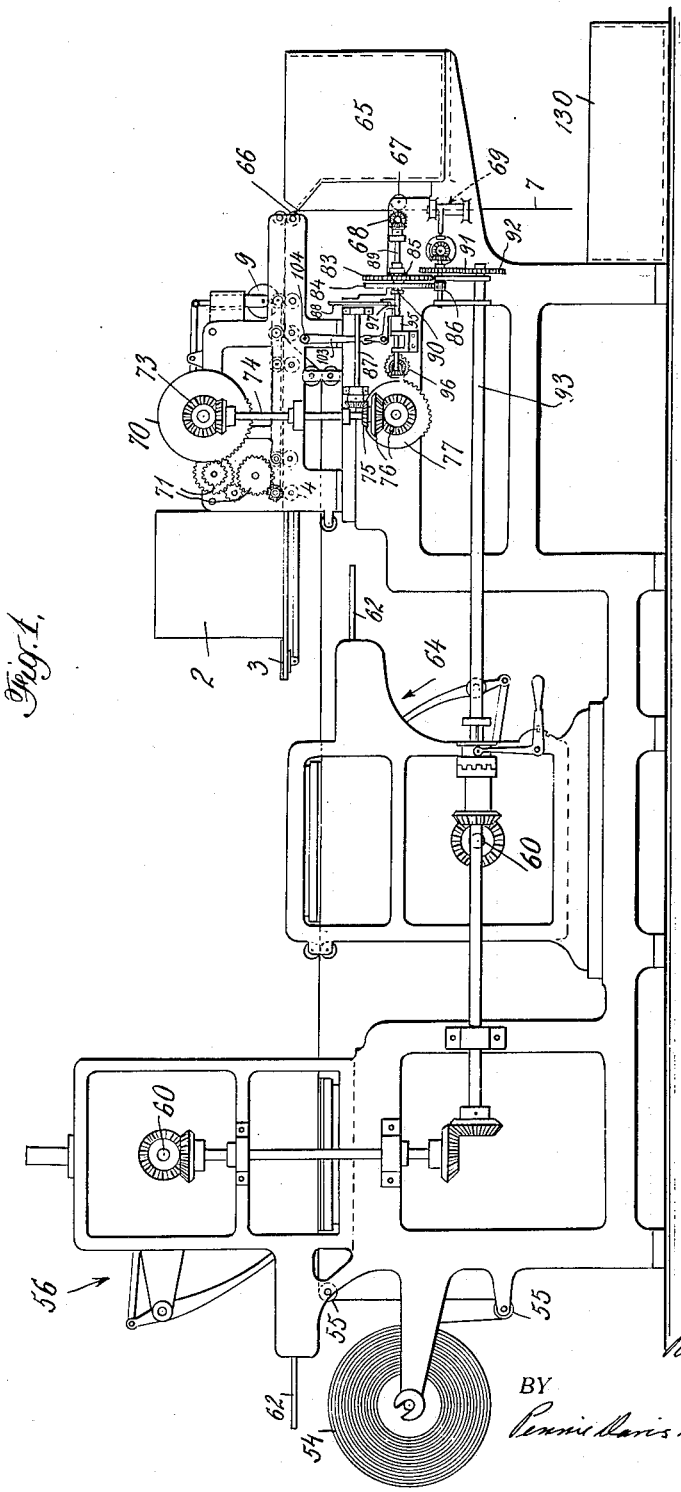

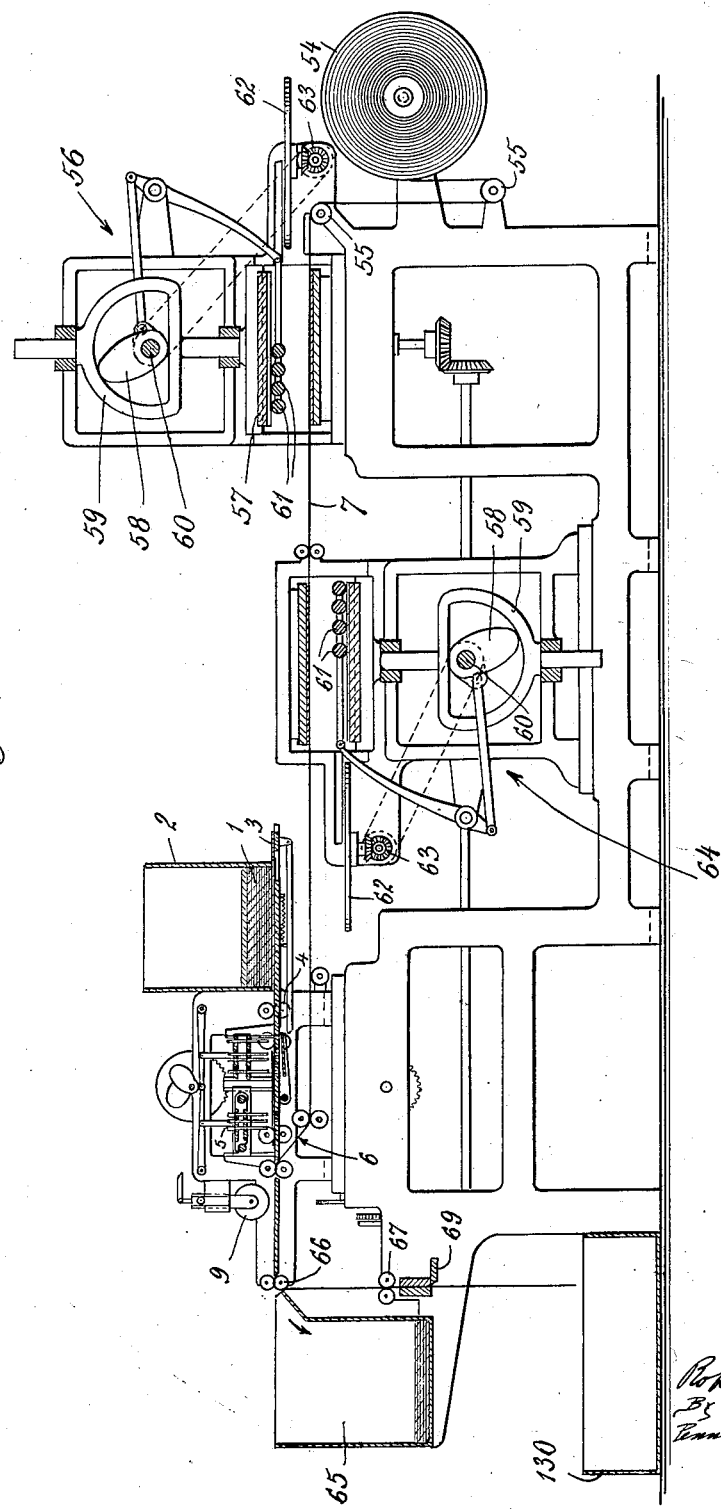

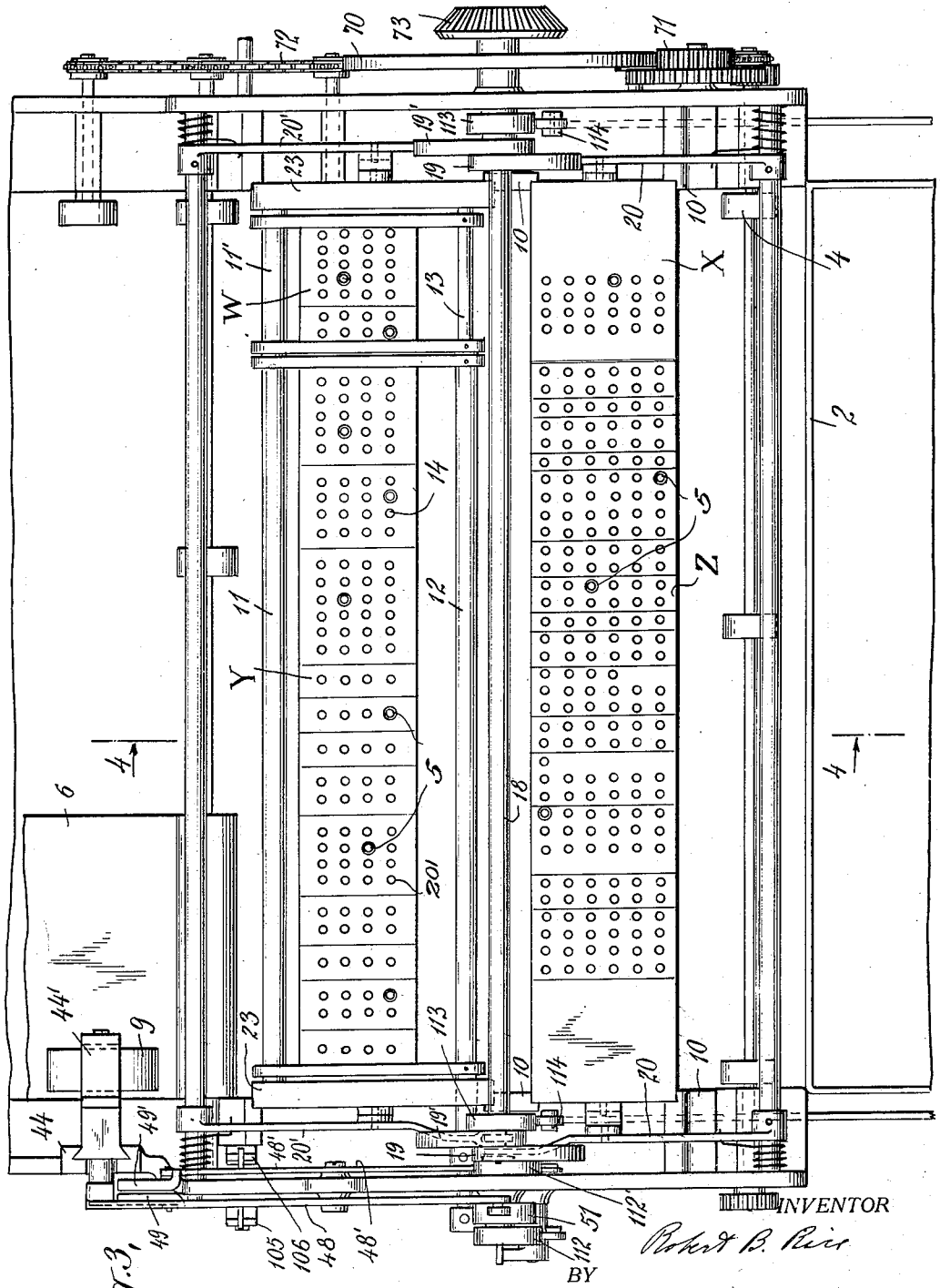

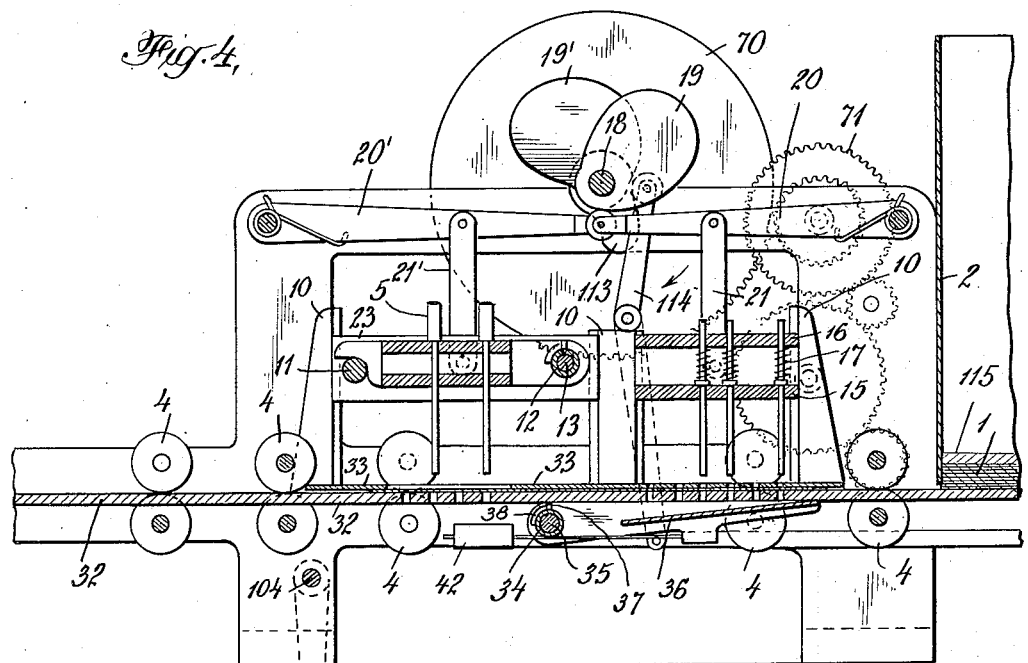
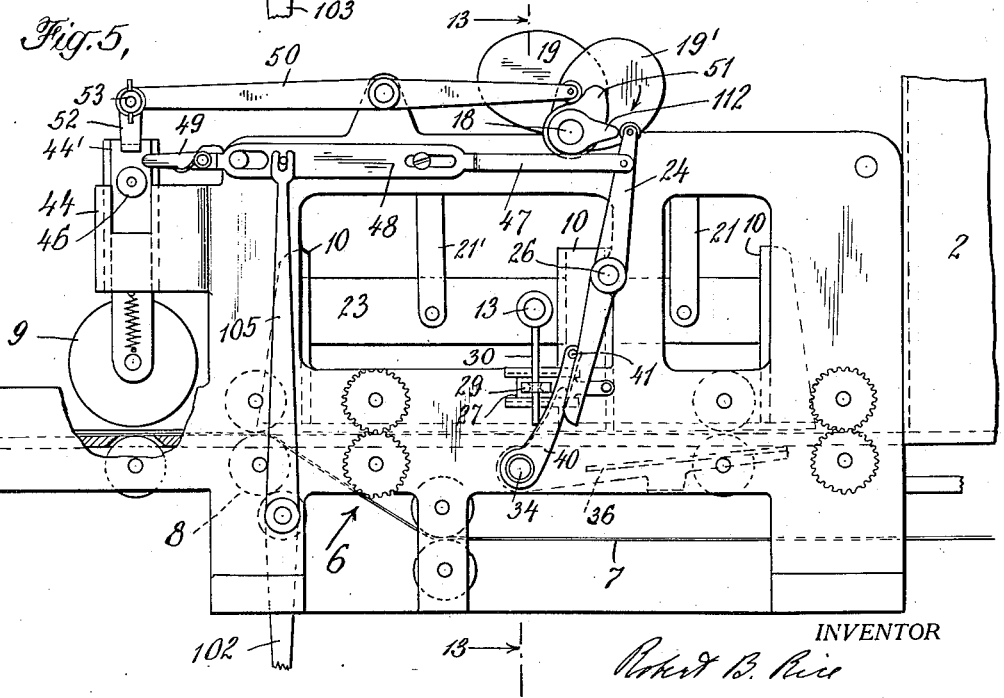

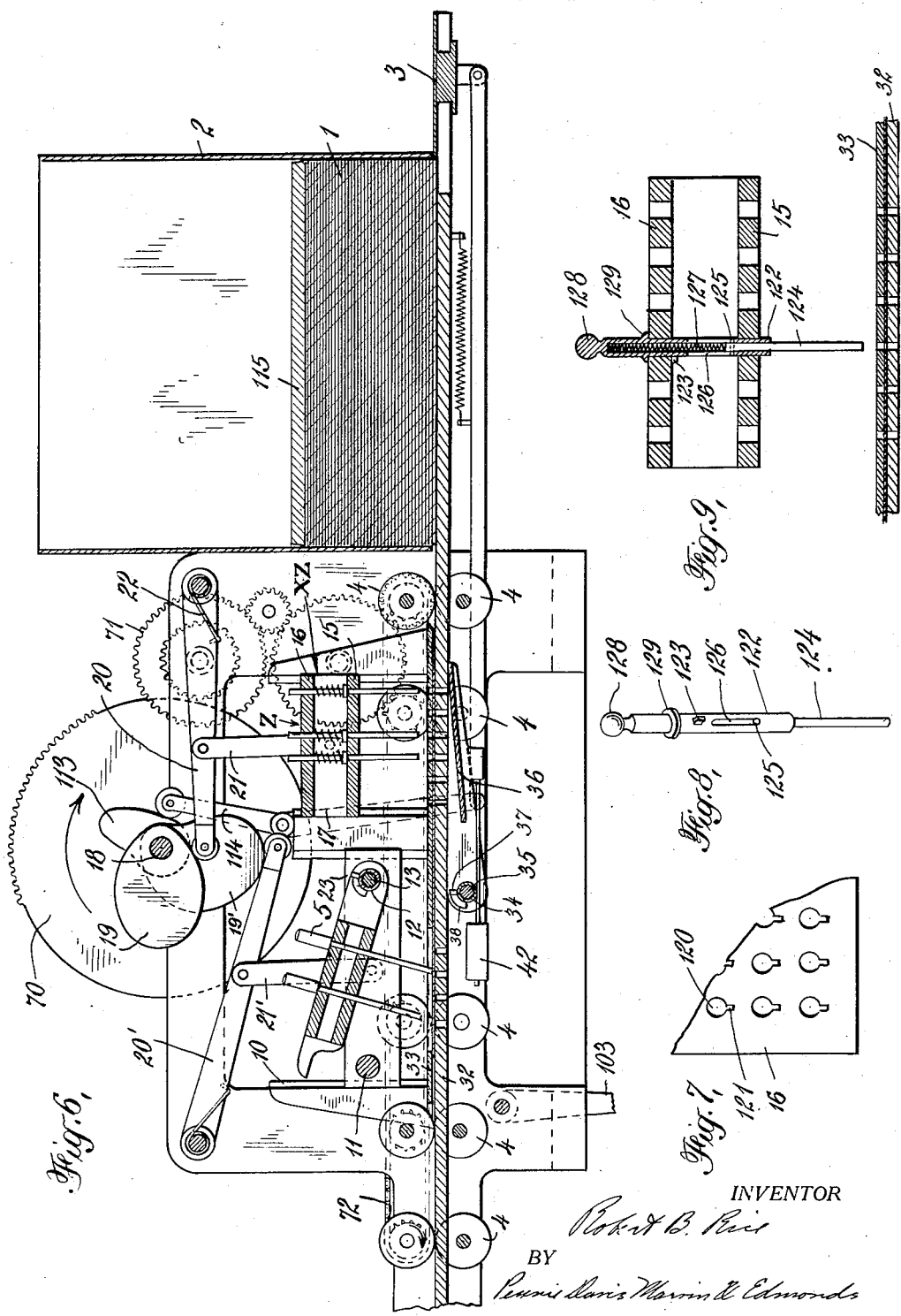

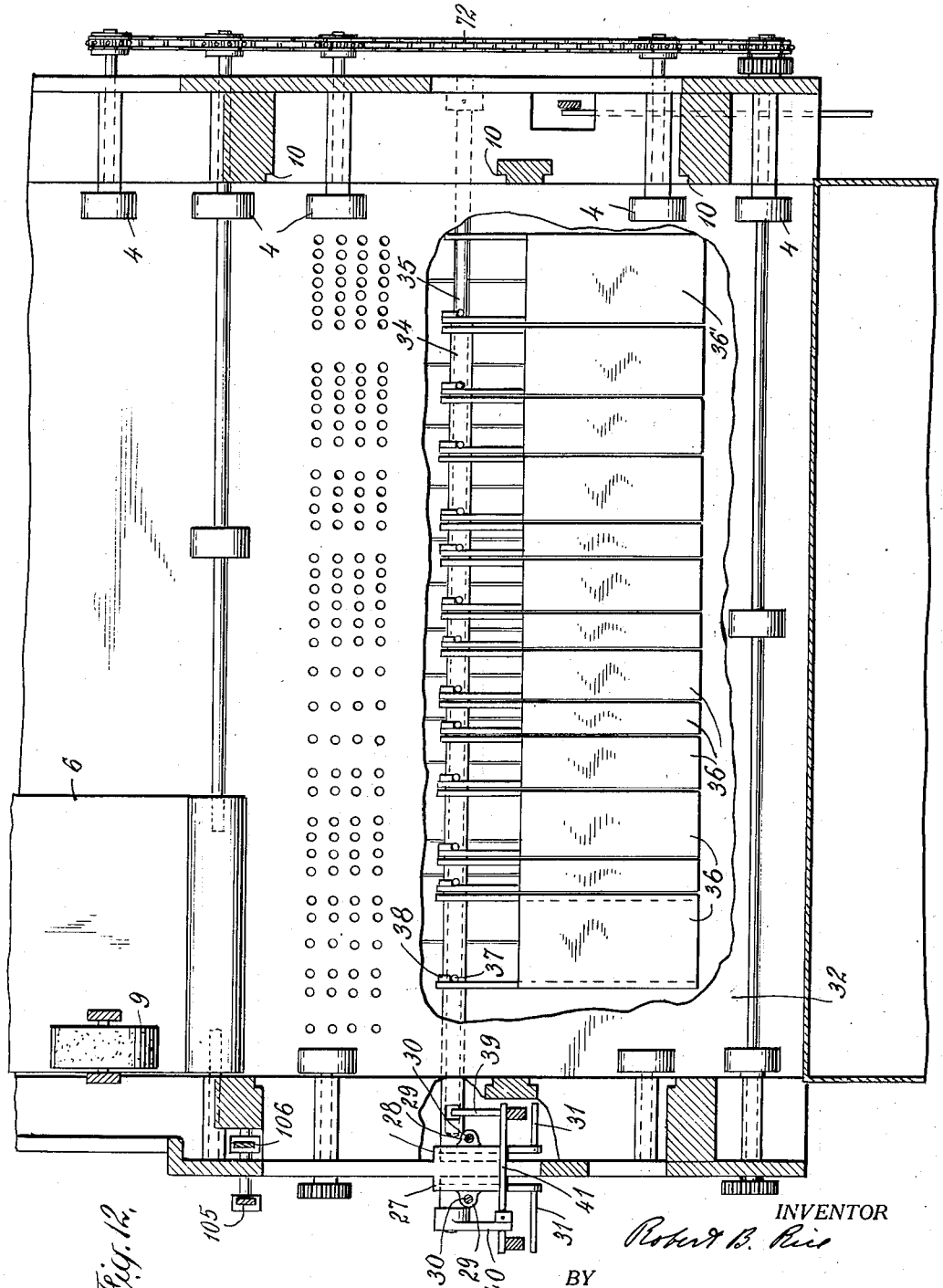

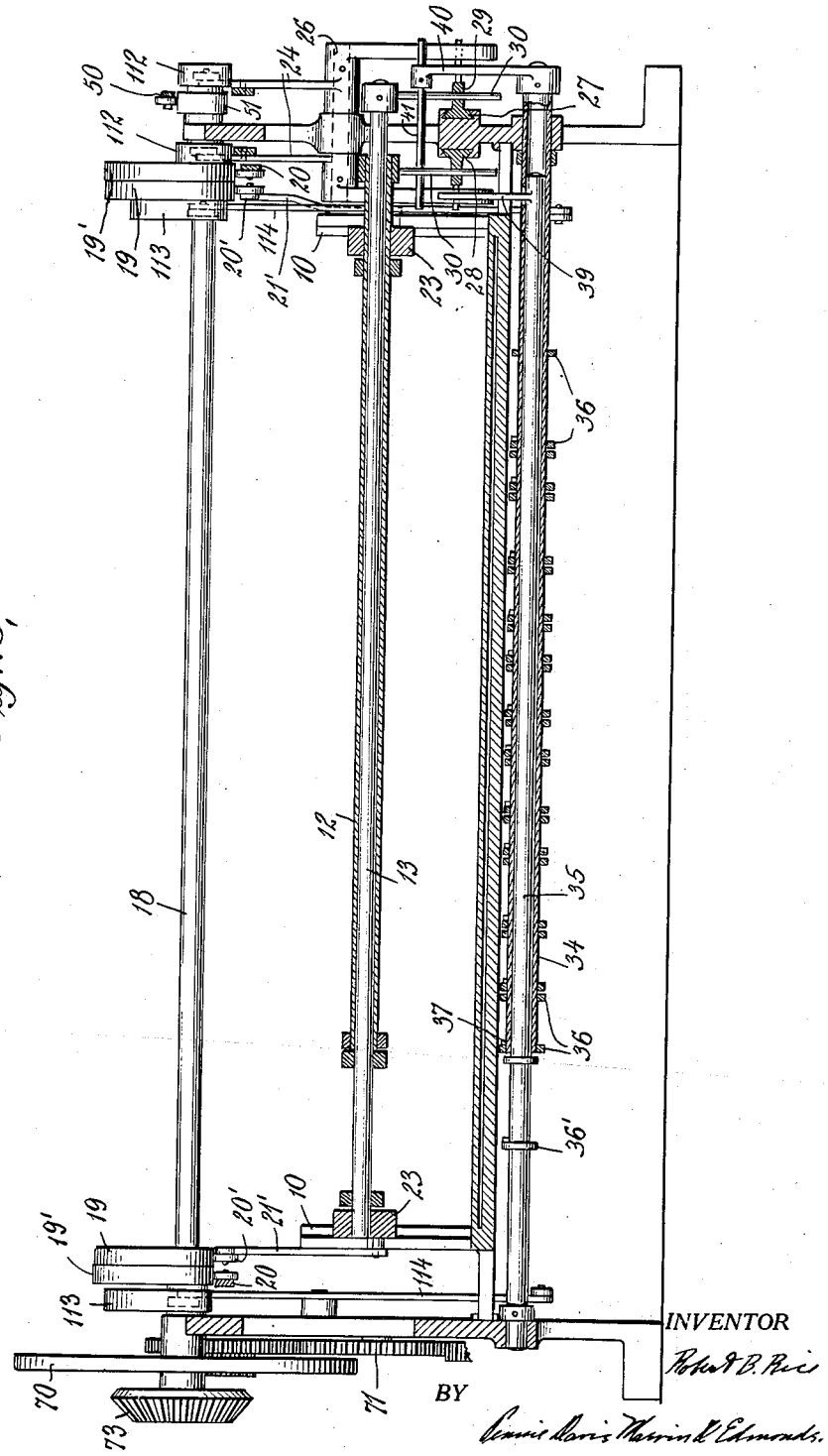

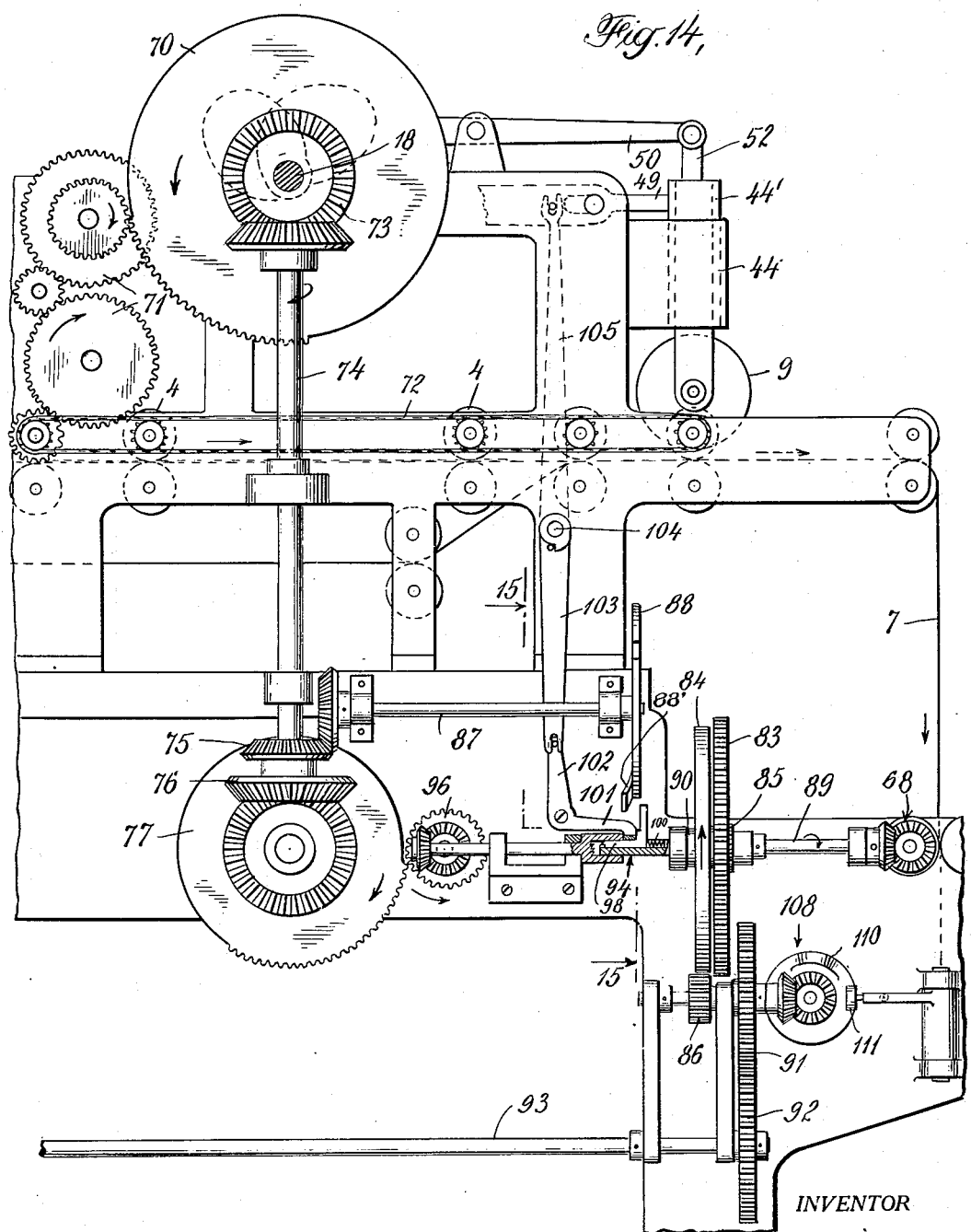

May 6, 1924.
R. B. RICE
CARD SELECTING MACHINE
Filed Oct. 21, 1922
1,493,053
11 Sheets-Sheet 10
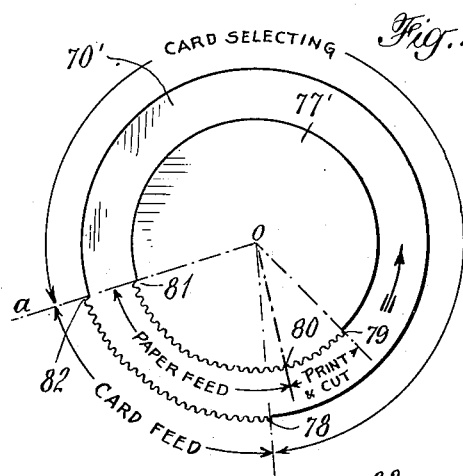
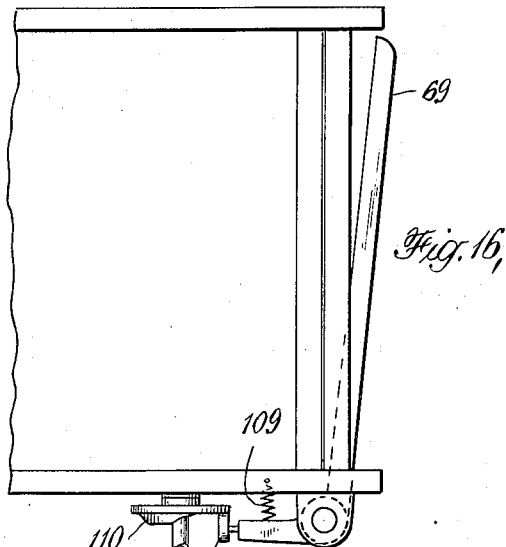
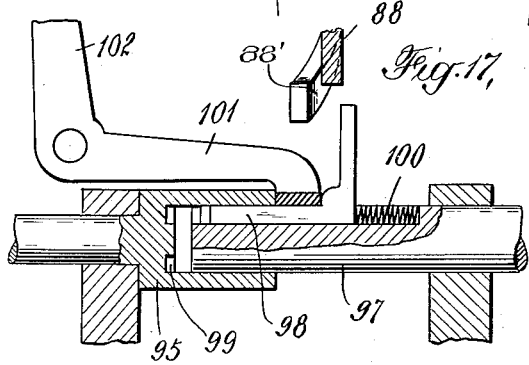
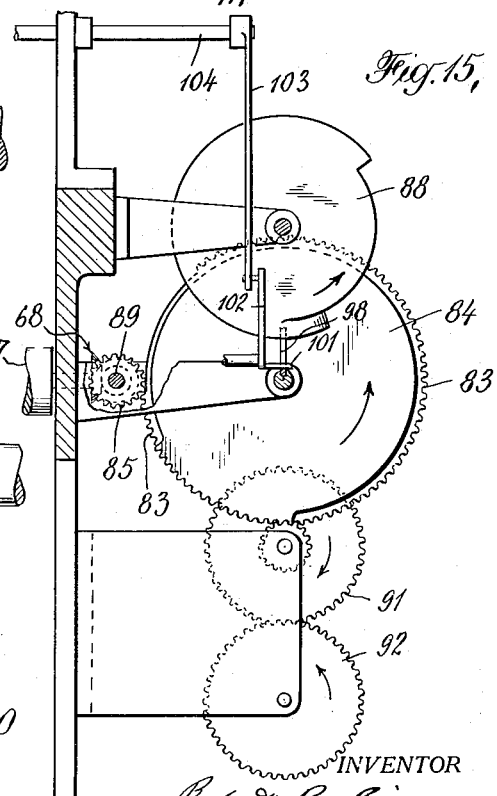
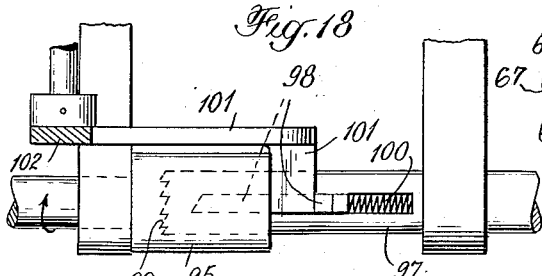
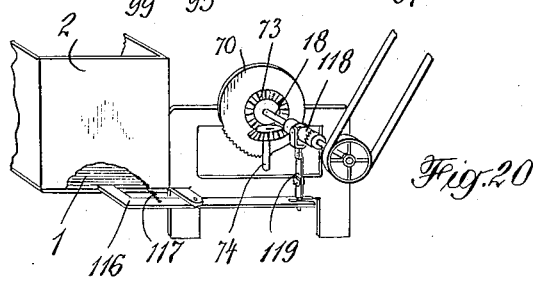
INVENTOR
Robert B. Rice
BY
ATTORNEY May 6, 1924.

R. B. RICE 1,493,053

Figures 21, 22:
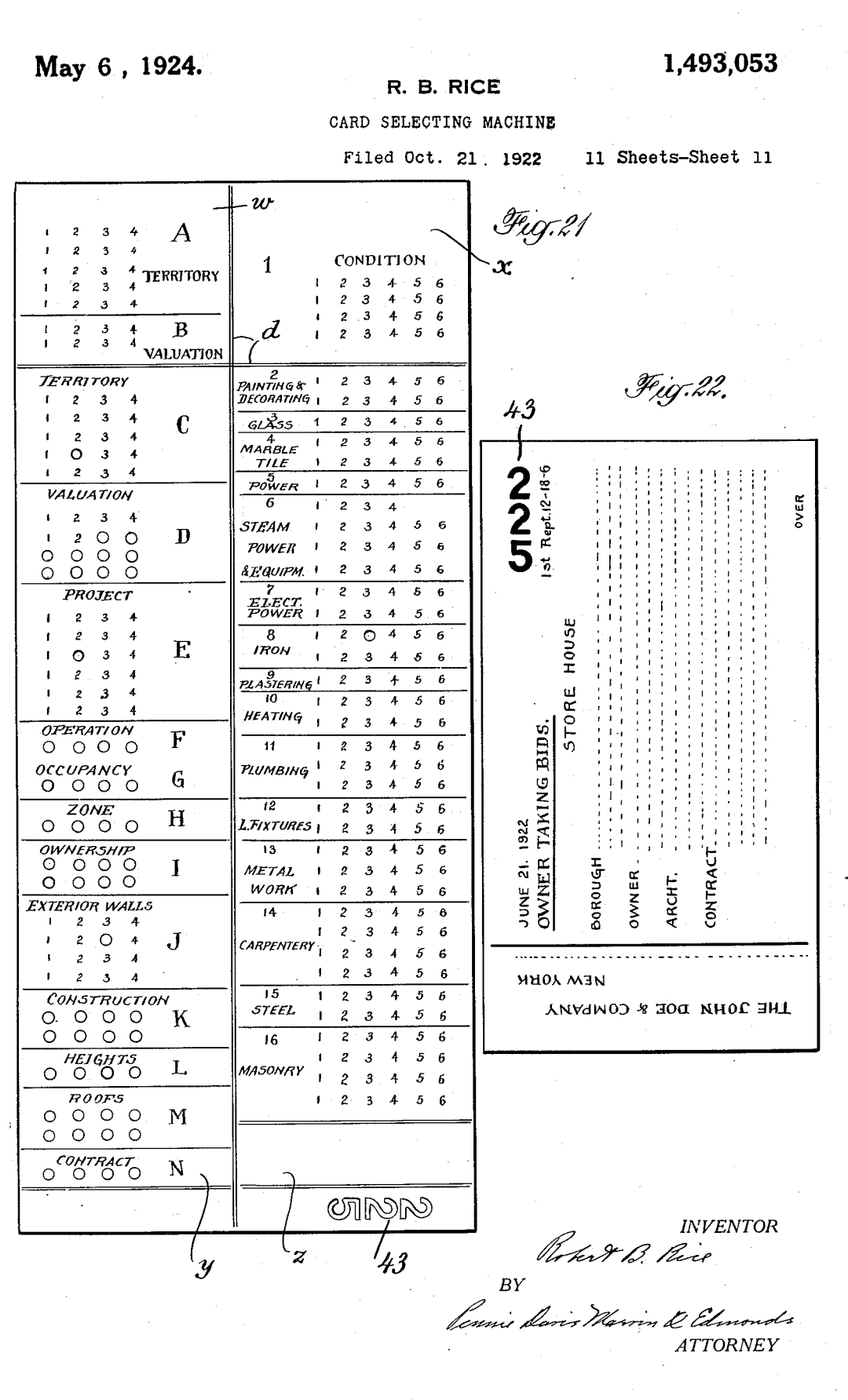

CARD SELECTING MACHINE

Filed Oct. 21, 1922   11 Sheets-Sheet 11

INVENTOR
Robert B. Rice
BY
*Pennie Davis Marvin & Edmonds*
ATTORNEY

Patented May 6, 1924.

UNITED STATES PATENT OFFICE.

ROBERT B. RICE, OF NEW YORK, N. Y., ASSIGNOR, BY MESNE ASSIGNMENTS, TO F. W. DODGE CORPORATION, A CORPORATION OF NEW YORK.

CARD-SELECTING MACHINE.

Application filed October 21, 1922. Serial No. 596,003.

*To all whom it may concern:*

Be it known that I, ROBERT B. RICE, a citizen of the United States, residing at New York city, in the county of New York, State of New York, have invented certain new and useful Improvements in Card-Selecting Machines; and I do hereby declare the following to be a full, clear, and exact description of the invention, such as will enable others skilled in the art to which it appertains to make and use the same.

This invention relates to a card selecting machine of the general type used for the purpose of selecting record cards having data recorded thereon by means of perforations in the cards.

This invention may be understood by considering its use as applied to a particular card selecting project. The business of supplying information to dealers in building materials is now being carried out by means of record cards of the type above referred to. The company supplying this information provides a record card for each dealer or client, the card giving the particular requirements of each dealer in regard to buildings in the process of being constructed. For instance, a dealer in a particular location or territory desires all the information available concerning, say apartment houses of a particular type and within his territory. Each of the other dealers or clients desires corresponding information about particular types of buildings in other specified territories. When the company receives a report relating to a particular building project, it is necessary to select the cards of all dealers who desire all or any of the information given on the report so that a copy of the report may be sent to each of these dealers. Heretofore, it has been necessary to select the cards desired by hand, or to subject all of the cards to several tedious machine operations for the purpose of selecting the desired cards.

Accordingly, one of the principal objects of this invention is to provide a unitary machine adapted to select the cards of all the dealers to which a given report should be sent, the selection being performed as the cards are passed thru the machine a single time.

To anyone familar with machines of this type, it should be apparent that in order to construct a satisfactory machine to do this work it is necessary to harmonize a large number of conflicting conditions in order to avoid the possibility of omitting to send certain information to certain dealers, or of sending the information to dealers who do not want it. One dealer may desire information concerning school houses in his territory having a certain type of exterior wall, a certain valuation, and other specific features, provided a particular type of ornamental iron work is to be used. A second dealer may require all the information available concerning ornamental iron work in buildings of any type provided they are in his territory. A third dealer may require information concerning schoolhouses in his territory and of certain valuation, provided ornamental iron work is to be used, the character of the exterior walls and other details of the project being immaterial to him. A fourth dealer may require information concerning schoolhouses in his territory, in which ornamental iron is to be used. A fifth dealer may require all information available concerning schoolhouses in a certain condition, or stage of completion. Another dealer may desire the report if it gives the information required by the first dealer, or that required by any one of the other four. Thus it should be apparent that various conflicting conditions must be harmonized before a satisfactory selection can be made by mechanical means.

The present invention not only provides a means for selecting cards in the manner above mentioned, but also provides a unitary mechanism by means of which copies of reports may be printed, and numbers or other index characters on the record cards of the client may be printed or stamped on the printed copies or records which may then be sent out to the dealers designated by these numbers. When the company using this invention receives a report relative to a building project in a certain locality, the report is set up in the analyzer of the machine and it is also set up in forms which are placed in printing devices whereby the report may be printed on a long strip of paper which is later severed into sections, one for each of the dealers desiring a copy of the report. The selecting or analyzing means determines automatically to which of the customers, subscribing for such information, the particular report set up in the machine, is to be sent, and causes the machine to stencil on the printed slips numbers corresponding to these customers. A card is provided for each subscriber giving his particular requirements. All of the cards are run through the machine and the analyzer determines which of the cards are to have their identification numbers stenciled on the printed report slips. Thus by means of this invention it is possible to send out record slips to the clients without sorting the cards by hand, or otherwise separating the cards from each other.

The above described features and various others will be apparent from the following detailed description which is to be considered in conjunction with the accompanying drawings, in which, Figs. 1 and 2 are side elevations of the complete selecting machine;

Fig. 3 is a top plan view of the analyzing mechanism of the selecting machine;

Fig. 4 is a transverse section taken on line 4—4 of Fig. 3 showing the details of the analyzing mechanism;

Fig. 5 is an elevation of the mechanism used for stamping or stencilling the index numbers on the report slips;

Fig. 6 is a transverse section of the analyzing mechanism taken on line 4—4 of Fig. 3, showing a later stage in the operation of analyzing a card, than that shown in Fig. 4;

Fig. 7 is a fragmentary view of a portion of one of the analyzer plates or pin supports;

Fig. 8 is a perspective view of an improved form of analyzer pin;

Fig. 9 is a transverse section of part of the analyzer mechanism showing a pin inserted in the pin supports;

Fig. 10 is a fragmentary perspective view of the analyzing mechanism showing the details of construction;

Fig. 11 is a diagrammatic view of some of the parts of the analyzer showing the manner in which they cooperate;

Fig. 12 is a horizontal section of the analyzer mechanism showing the construction of the lower part of the analyzer;

Fig. 13 is a vertical longitudinal section of the analyzer taken on line 13—13 of Fig. 5, showing the details of construction;

Fig. 14 is an elevation of the gear mechanism of the machine;

Fig. 15 is a section view, taken on line 15—15 of Fig. 14;

Fig. 16 is a plan view of the knife mechanism used for the purpose of cutting the record strip;

Fig. 17 is a vertical section of a clutch mechanism;

Fig. 18 is a top plan view of the clutch mechanism shown in Fig. 17;

Fig. 19 is a diagram of the events in the cycle of operations of the machine;

Fig. 20 is a perspective view, partly in section, of some of the details of the machine;

Fig. 21 is a plan view of a form of record card; and

Fig. 22 is a plan view of a form of report slip.

The type of card shown in Fig. 21 has been found useful in connection with supplying information to dealers as described above. This card, shown in Fig. 21, is divided into four sections or zones $w$ $x$ $y$ and $z$ by double ruled lines $d$. The section $w$ includes two sub-divisions A and B for the territory and valuation, respectively, of the project or building in the process of being constructed. Section $y$ contains sub-divisions C to N, inclusive, relating to the type of project and giving various details such as the type of exterior wall and the height of the building. The territory and valuation are also represented in this section for a reason hereinafter explained. Section $x$ is reserved for the condition of the building or stage in the process of construction, and section $z$ may be termed the notation field or section. It includes sub-divisions 2 to 16, inclusive, containing such items as plastering, heating, lighting fixtures and metal work. Each number in each sub-division represents a different state of facts. As mentioned above, one or more of these record cards is filled out for each client or dealer. The territory that a particular dealer wants is indicated by punching a certain number in the territory field, and the other items are indicated in a similar manner in the proper places on the card. A number 43 or other suitable index character is punched at one end of the card. This number 43 serves as a means of identifying the dealer represented by a card.

Referring to Fig. 3 it may be noted that the analyzer of the selecting machine has four sections W X Y and Z corresponding to the four sections $w$ $x$ $y$ and $z$ of the record card shown in Fig. 21. As shown in Fig. 3, the sections X and Z are made integral. The members comprising these sections may be made of wood or any other suitable material. The sections X Z are mounted within guides 10 in such a manner that they may be moved up and down. The section Y also comprises a thin strip of wood, or other suitable material. This section is supported by shafts 11 and 12, the shaft 12 being hollow and enclosing the shaft 13 which serves as a support for the shaft 12. The section Y is fixed to the shaft 12 which is rotatably mounted on the shaft 13. The section W is similar in all respects to section Y except that it is preferably shorter than section Y. Like section Y, section W is supported on one side by the shaft 11. On the other side it is fixed to the rotatable shaft 13. The sections W X Y and Z are provided with perforations 14 corresponding in number and arrangement with the perforable spaces in the record card shown in Fig. 21. These sections are also divided into smaller sections corresponding with the small sub-divisions of the card shown in Fig. 21.

In Fig. 6 a transverse section of the analyzing mechanism is shown. The cards 1 to be analyzed are placed within the receptacle 2 shown at the right in Fig. 6. A reciprocating mechanism 3 is provided for the purpose of feeding the cards from the receptacle 2, one at a time, to feed rollers 4. The feed rollers 4 convey the card to the center of the analyzing mechanism where the card is automatically brought to rest. The analyzing sections W X Y and Z are then caused to reciprocate in their vertical guides 10 and analyze the card. Pins 5 and 5' are provided which may be inserted in the perforations in the sections W X Y and Z, the position of these pins being determined by the report which it is desired to send to the dealers represented by the record cards. That is, the pins 5 and 5' are set up in the sections W, X, Y and Z, in certain holes which represent the details of the particular report. As shown in Fig. 5, a report strip 7 passes along underneath the analyzing mechanism proper and then passes upward as shown at 6 over suitable guide rolls 8 until it passes under the stenciling roll 9. If the dealer represented by the card being analyzed desires the information in the report represented by the pins 5 and 5' in the sections W X Y and Z, then the analyzer functions in such a manner that when the card 1 passes away from the analyzer proper, the dealer's number or index character is stenciled on the report strip 7 by means of the stenciling roll 9. If the particular dealer represented by the card in question does not desire the information in the report set up on the analyzer, the analyzer functions in such a manner that when the card passes away from the analyzer proper, the stenciling roll 9 does not operate.

By referring to Fig. 6 it may be noted that the member Z X is provided with a lower plate 15, as well as the upper plate 16, both plates being perforated so that they may receive the pins 5' which are yielding in character by virtue of springs 17. The representations of pins 5' shown in Figs. 4 and 6 are diagrammatic only, and should be considered as such. The member Z X is reciprocated within the guides 10 by means of the central shaft 18. Two cams 19 are provided on the shaft 18 for engagement with the rocker arms 20 which are connected with the member Z X by means of the links 21. The rocker arms 20 are held against the cams 19 by means of springs 22.

Referring to Figs. 3 and 6 it may be noted that the shafts 11, 12 and 13 are mounted in end pieces 23. These end pieces are connected to rocker arms 20' by means of links 21'. The arms 20' are actuated by means of cams 19'. The cams 19 and 19' are preferably timed in such a manner that the sections Z X lead the sections Y W. That is, the sections Z X reach an extreme position before the sections Y W reach their corresponding extreme positions.

At one end of the analyzing mechanism it may be noted that there are two substantially vertical bars 24 and 25, best shown in Fig. 10. These bars are pivoted on a shaft 26. The shaft 13 is adapted to move the vertical bar 24 in one direction by means of a cross head device 27, and the shaft 12 is adapted to move the bar 25 by a similar cross head mechanism 28. Each cross head device comprises a horizontally movable member 29 adapted to be moved by pins 30 which are fastened to the shafts 12 and 13. The members 29 engage the bars 24 and 25 by means of pins 31. It is therefore obvious that when the section Y swings upward around the axis of the shaft 12, that the lower end of the bar 25 is pulled forward by the corresponding pin 31. Likewise when the section W swings upward the shaft 13 turns and therefore the lower end of the bar 24 is pulled forward by means of the cross head mechanism 27.

The analyzing mechanism is provided with lower and upper bed plates 32 and 33. The cards 1 pass between the lower and upper bed plates into position below the analyzing sections X Y W Z. From Figs. 4 and 12 it may be noted that there is a shaft 34 below the lower bed plate 32. This shaft 34 is hollow and rotatably mounted on a shaft 35. A plurality of thin plates 36 are mounted on the shaft 34 in such a manner that when any one of the plates 36 is pressed down the shaft 34 turns. This is accomplished by providing pins 37 on the shaft 34, adapted to engage lugs 38 fixed to the plates 36. The purpose of this construction is to avoid the necessity of moving a heavy member when it is desired to turn the shaft 34. A thin plate 36' is mounted on the shaft 35 in such a manner that when it is pressed down the shaft 35 turns. By referring to Figs. 10, 11 and 12 it may be noted that the shaft 35 has provided on one end thereof a lateral projection 39 adapted to engage the vertical bar 25. The hollow shaft 34 has a member 40 attached to the end thereof, this member 40 having a pin 41 in the end thereof mounted in such a manner that the pin may engage both the bars 24 and 25. The thin plates 36 and 36' are mounted directly below the sections Z X and are preferably counterbalanced by means of a suitable weight 42 shown in Fig.

6. The adjustment of these thin plates 36 and 36' is such that they may be depressed by the yielding pins 5' carried by either of the sections Z X.

From the preceding paragraph it should be evident that when a pin in section X depresses the plate 36' the shaft 35 turns, and, therefore, the bar 25 is forced into its upright position by means of the projection 39. Likewise, if any pin in section Z forces any one of the thin plates 36 down the shaft 34 turns, and, therefore, both bars, 24 and 25, are forced into this upright position.

When a card is being analyzed the sections Z X descend before the sections W Y, and if any pin in section Z engages a perforation in the card it passes through the perforation and forces down one of the plates 36. Likewise if any pin in section X passes through a perforation in the card it forces down the thin plate 36'. After the sections Z X have reached their lowest positions and start upward the sections Y and W reach their lowest positions. If all of the pins in section Y register with perforations in the card the pins pass through the card and the shaft 12 does not turn. If any pin in section Y does not register with a perforation, this section is held up and as the shafts 11 and 12 descend further, the section Y rotates the shaft 12. If all the pins in section W register with perforations in the card, the pins pass through the card and the shaft 13 is not turned. If, however, any one of the pins in this section does not register with a perforation, this section is held back by the pin engaging the unperforated portion of the card, and the shaft 13 is turned.

The operation of analyzing can best be understood by referring to Fig. 11 which shows, diagrammatically the sections Y and W, and the thin plates 36 and 36' actuated by the sections Z and X, respectively. If any pin in section Z passes through a perforation in the card, one of the members 36 is depressed, and, therefore, the shaft 34 is turned, thus forcing both bars 24 and 25 upright, that is, forcing the lower ends of these bars away from the shaft 34. If any pin in section Y fails to register with a perforation, this section is held up and the shaft 12 turned. This has the effect of forcing the bar 25 away from its upright position. If any pin in section W does not register with a perforation in the card, this section will be held back, the shaft 13 turned, and, therefore, the bar 24 will be forced away from its upright position.

When a card is analyzed which has perforations therein corresponding with the pins in the sections W X Y and Z, the stenciling roll 9 should function in such a manner that when the card passes away from the analyzer proper, the index number in the card is recorded in the report slip 7, passing under the stenciling roll 9. A typical index number is shown at 43 in Figs. 21 and 22. The stenciling roll 9 is caused to operate by being moved downward. It is, therefore, supported by a frame 44' which is mounted in a vertical guide 44 and is normally held in its uppermost position by means of a suitable coiled spring 45. A roller 46 is provided near the upper end of the stenciling roll frame 44'. A substantially horizontal member 47 is pivoted to the bar 24 and has a spring mounted lug or projection 49 at the extremity thereof and in close proximity to the roller 46 on the printing roll frame 44'. A similar horizontal member 48 is pivoted to the bar 25. This member 48 is also provided with a spring mounted member 49' at the extremity thereof. When the bars 24 and 25 are forced into their upright positions, the spring mounted lugs 49 and 49' are moved into a position directly above the roller 46. A lever 50 is provided on the machine, this lever being actuated by the cam 51 on the shaft 18. A depending member 52 is provided at the free end of the lever 50, this member 52 being held in place by a thumb screw 53. The purpose of this arrangement is to make it possible to move the member 52 from its operative depending position into an inoperative position if it is so desired. If the lugs 49 and 49' are directly over the roller 46 as mentioned above, the stenciling roll 9 is pressed downward by virtue of the member 52 attached to the lever 50. If the lugs 49 and 49' are not directly above the rollers 46 the stenciling roll 9 is not forced down when the lever 50 operates, due to the fact that the member 52 is not long enough to touch the roller 46.

From Figs. 1 and 2 it may be noted that the report strip 7 is fed from the roll 54. The strip 7 passes around rollers 55 to a printing device indicated generally by the character 56. This printing device 56 is provided with a type holder 57 mounted so that it may reciprocate vertically and print all or part of a report on the top face of the report strip 7. The type holder 57 is caused to reciprocate by means of a positive motion cam 58 and follower 59, the cam 58 being mounted on a shaft 60. A plurality of inking rolls 61 are provided for the purpose of supplying ink to the type. These rollers are mounted so that when the shaft 60 turns they reciprocate in a horizontal plane and alternately touch the type in the holder 57 and the inking pad 62. The ink pad 62 may be rotated by any suitable means such as the chain and bevel gears 63. A second printing device, denoted generally by reference character 64, may be provided for the purpose of printing part of the record on the underside of the report strip 7. This printing device 64 corresponds in all respects with the printing device 56, like parts bearing the same reference characters.

As the report strip progresses beyond the printing devices 56 and 64 it passes under the analyzer and then upward into contact with the record cards as they pass from the analyzer. At this point, the index numbers on the record cards are stenciled on the record strip in the manner described above. The record cards after passing the stenciling roll 9 are deposited in a card receptacle 65. The report strip after passing beyond the stenciling roll 9 passes between suitable guide rolls 66 and then downward between rollers 67 which are positively driven by means of bevel gears 68, shown in Fig. 1. These rollers 67 serve as a means for pulling the report strip through the selecting machine. After passing the rollers 67 the report strip is subjected to the action of a knife 69 which severs the report strip to form individual printed slips which bear the numbers of certain dealers or clients and may therefore be sent out to these dealers or clients who desire the information printed on the slips by the printing devices 64 and 56.

The various parts of the improved selecting machine are driven by means of the main drive shaft 18 above referred to. This shaft 18 may be caused to revolve at constant speed by any suitable means (not shown). This shaft carries the cams 19 and 19' and also carries an intermittent gear 70 (see Figs. 6 and 14). This intermittent gear 70 drives the feed rollers 4 by means of a suitable gear train 71. The rollers 4 are preferably tied together by some suitable means, such as the chain 72, shown in Fig. 6. The intermittent gear 70 is designed in such a manner that while the analyzing is being performed the teeth on the gear do not drive the gear train 71. After the analyzing is completed, the teeth 70 engage the teeth on one of the gears in the train 71 and cause the analyzed card to pass away from the analyzer. At the same time, an unanalyzed card is conveyed by the feed rollers 4 from the card receptacle 2 to the proper position beneath the analyzer sections W X Y and Z. When the analyzed card reaches this position the teeth on the intermittent gear 70 no longer drive the gear train 71, and as the shaft 18 continues to turn the card is analyzed.

The shaft 18 also carries at one end thereof a bevel gear 73 which drives a vertical shaft 74 which carries two bevel gears 75 and 76 at the lower end thereof. The purpose of the shaft 74 and the gears associated therewith is to provide a means for driving the printing devices 56 and 64, and for driving the gears 68 which cause the report strip to be pulled through the machine. The cycle of events takes place in the order shown in the diagram of Fig. 19. In this diagram the outer gear 70' represents the intermittent gear 70 which drive the card feed rollers 4 after the manner above described. The inner gear 77' represents the intermittent gear 77 driven by the bevel gear 76 on the vertical shaft 74. By referring to Fig. 14 it may be noted that the intermittent gears 70 and 77 are driven continuously and with the same speed by virtue of the continuous rotation of shaft 18.

In the diagram shown in Fig. 19 the gears 70 and 77 are represented as mounted to rotate in the same direction merely for the purpose of illustrating the operation of these intermittent gears. By considering line $oa$ as a reference line and that the gears 70 and 70' are rotating in the direction indicated by the arrow, it may be noted that until the tooth 78 on gears 70' reaches the line $oa$ a record card in the analyzer remains stationary and the analyzing or selecting operation takes place. When the tooth 79 on gear 77' reaches the line $oa$ the printing devices 56 and 64 are caused to operate in a manner to be hereinafter described. When the tooth 80 reaches the line $oa$ the printing operations are completed and the gears 68 start rotating to cause the report strip to advance through the machine. When the teeth 81 and 82 reach the line $oa$ the report strip and cards stop moving and the selection operation commences. It is thus evident that the printing devices 56 and 64 operate while the card selecting operation is going on. The report strip starts to move before the report card starts to pass away from the analyzer. It is to be understood that any similar arrangement or timing of the events may be employed, the only requirements being that when the stenciling roll 9 operates the report strip and record card must move simultaneously, and, of course, the record card must not move while the analyzing operation is being performed. The printing devices 56 and 64 may operate at any time when the report strip is stationary.

It may be noted that the gear 77 rotates continuously. This gear is provided for the purpose of supplying power to the printing devices 56 and 64 and for driving the gears 68 which pull the report strip through the machine. It is obvious that when a report set up in the selecting machine is such that a particular client does not desire the information given by the card, that the index number on that client's card should not be printed on the report strip. Thus it is not necessary for the report strip to be advanced one step when this particular card passes through the machine. The apparatus which provides for this condition, comprises a clutch device associated with the intermittent gear 77. The beveled gear 75 drives a shaft 87 which carries a disc 88 at the end thereof. The configuration of this disc 88 is best shown in Fig. 15. Obviously, this disc 88 revolves at constant speed. The gears 68 which cause the report strip to pass through the machine are driven by an intermittent gear 83, by means of a spur gear 85 mounted on the shaft 89. The shaft 90 on which the intermittent gear 83 is mounted also carries a second intermittent gear 84 which drives the printing devices 56 and 64 by means of gears 86, 91, 92 and shaft 93. By referring to Fig. 15, it may be noted that the intermittent gears 83 and 84 are designed and arranged in such a manner that the printing devices 56 and 64 operate while the report strip 7 is stationary. The intermittent gears 83 and 84 are driven by the intermittent gear 77 through a clutch 24 which is held open except when it is necessary to advance the report strip 7.

By referring to Figs. 14, 17 and 18, it may be noted that the member 95 of the clutch 94 rotates whenever the teeth on the intermittent gear 77 engage a spur gear 96. A shaft member 97 carries a dog 98 adapted to engage teeth 99 in the member 95. A spring 100 tends to hold the dog 98 in engagement with the teeth 99. The configuration of the disc 88 is such that it prevents the dog 98 from engaging with the teeth 99 during the time required for the selecting operation. A member 101 also serves to hold the dog 98 away from the teeth 99 at certain times. This member 101 forms a part of a rocker arm 102 which is actuated by the depending arm 103. The arm 103 is fastened to the shaft 104 which may be turned by either of the arms 105 or 106 which are actuated by the horizontal reciprocating members 47 and 48, respectively. (See Figs. 10 and 14.) It is obvious, therefore, that while a card is being analyzed the dog 98 is held away from the teeth 99 by virtue of the disc 88, whether or not the member 101 is also holding the dog 98 out away from the teeth 99. If, during the process of analyzing the card one or both of the members 47 and 48 are moved by the bars 24 and 25 so that the spring mounted lugs 49 and 49' are above the roller 46 of the printing frame 44', the member 102 will be rocked back so that the member 101 no longer engages the dog 98. If, as the analysis of the card becomes complete the members 47 and 48 remain in the position to which they were moved by the bars 24 and 25, the stenciling roll 9 will be forced down by the lever 50. It is, therefore, apparent that the printing devices 56 and 64 should function to print a new report slip. Accordingly, when the disc 88 revolves until the dog 98 is free, it engages the teeth 99 and, therefore, the intermittent gears 83 and 84 rotate and cause the printing devices 56 and 64 to function and also cause the report strip to be pulled through the machine another step. The dog 98 is returned to its inoperative position by the curved lip 88' of disc 88 after the printing devices have functioned. The knife 69 is caused to function so as to cut the report strip. This is accomplished by means of the gear and cam arrangement shown at 108 in Fig. 14. This is shown to better advantage in Fig. 16 which shows the knife 69 normally held away from the paper by a spring 109. The knife is forced to operate by the cam 110, which actuates the follower 111 carried by the knife.

By referring to Fig. 10 it may be noted that a means is provided for returning the bars 24 and 25 to their inoperative position, that is, away from their upright position. This means comprises a cam 112 adapted to engage the bar 24 and a similar cam (not shown) adapted to engage bar 25. The purpose of these cams is to provide a means whereby the bars 24 and 25 may be returned to their inoperative position before an unanalyzed card is passed to the analyzer.

Another cam 111 (see Fig. 6) is mounted on the main drive shaft 18 for the purpose of actuating the lever 114 which reciprocates the mechanism 3 which forces the cards 1 from the card receptacle 2. The cards in the receptacle 2 are held down in place by means of a suitable cover 115.

An automatic cut-out device is shown in Fig. 20. This device is designed for the purpose of stopping the machine when all of the cards have been passed from the card receptacle 2. This consists of a lever 116, one end of which passes through an opening in the card receptacle 2 just above the feeding slide 3, so that it may engage the edges of the cards 1. This lever is held against the card by means of a spring 117. When all of the cards have passed from the receptacle 2, the lever 116 is free to move forward into the receptacle, and when this movement takes place a clutch 118 on the shaft 18 is opened by means of a link 119 connecting the clutch with the lever. If a cover is used for the purpose of holding down the cards in the card receptacle 1, the cut out device may be arranged so that the lever 116 will just slide over the upper surface of the cover when all of the cards have passed out of the receptacle.

Fig. 7 shows a portion of one of the analyzer sections. The perforations 120 in the plate 16 are made in such a manner that rectangular notches 121 are formed. The plate 16 is perforated in this manner so that the type of pin shown in Figs. 8 and 9 may be used. This pin comprises a cylindrical casing 122 having a small projection 123 provided on the outer surface thereof. This projection is of such dimensions that it will readily pass through one of the notches 121 in the plate 16. The movable part of the pin comprises a small rod 124 having a pin 125 at the upper end thereof engaging a slot 126 in the casing 122. A spring 127, shown in Fig. 9, is provided within the casing 122 and serves as a means for holding the rod or needle 124 in its lowest position. Each pin may be provided with a suitable knob or handle 128 so that it may be readily inserted in the plate 16. These pins are inserted in such a manner that the lug or projection 123 engages the notch 121. After the pin has been inserted until the shoulder 129 engages the plate 16, the pin is turned so that lug 123 no longer registers with the slot 121. Thus the pin is locked in position.

From the above description it should be apparent that the analyzer proper comprises four distinct sections W X Y and Z arranged so that they cooperate with each other to analyze the cards that are passed through the machine. It should be apparent that the stencilling roll 9 could be replaced by any desired device which may be actuated by a lever 50, or some equivalent means. The stenciling device 9 is actuated by the analyzer sections through means comprising in general the two independent members or bars 24 and 25, and the connecting links 50, 47 and 48.

The analyzer section Z is arranged in such a manner that when any pin in this section passes through a perforation in a card being analyzed, this pin causes the independent bars 24 and 25 to move into their upright or operative positions. The section X is arranged in such a manner that any pin therein registering with a perforation in the card will tend to move the bar 25 into its operative position. The section Y is arranged so that if any pin therein does not register with a perforation in the card this section moves in the direction to return the bar 25 to its inoperative position. Section W is arranged so that if any pin in this section does not pass through the record card the bar 24 is caused to move into its inoperative position.

In general, it may be stated that when all of the pins in any two of the analyzer sections register with perforations in a record card, either or both of the bars 24 and 25 are placed in their operative positions, and the index number on that card will therefore be printed on the report strip when the card passes away from the analyzer. One exception to this general statement is that when all of the pins in sections X and W only, register with perforations in the report card the stenciling roll 9 will not operate. This is true for the reason that in this event section X causes the arm 25 to be moved to its operative position, and section Y returns the bar 25 to its inoperative position. The bar 24 is not moved to its operative position, hence, the section W has no effect on the operation of the printing roll 9. The sections X and W are arranged in this manner for the obvious reason that no client desires information concerning a project in his territory and in a certain condition whether or not the information relates to a certain type of project or to the particular industry with which he is concerned. The other exception is that the stenciling roll 9 will not operate when all of the pins in sections Y and W register with perforations in a card and none of the pins in sections Z and X register with perforations in the card. Under this condition it is apparent that the bars 24 and 25 are not moved to their operative positions, hence, the sections Y and W have no effect on the printing mechanism. The practical reason for this arrangement is that no client desires information concerning the particular type of building in his territory unless there is also information concerning his particular industry or unless the building is in a certain condition or state of construction.

The utility of my invention may be more fully appreciated upon considering a few specific examples of how the machine operates to select certain cards. The card illustrated in Fig. 21 shows the requirement of a dealer who desires information concerning schoolhouses in his territory, having a certain type of exterior wall, a certain minimum valuation, and requiring a particular type of ornamental iron work, would have sections C, D, E, J and 8 (see Fig. 21) of his card punched; i. e. the number in section E representing schoolhouses would be punched and the number in section C representing the certain territory would be punched, etc. Since this dealer is not interested in the remaining details listed under sections C to N, incl., on his card, all the numbers in sections F, G, H, I, K, L, M and N would be punched out as shown, and all of the number in subdivision D representing valuations higher than that specified by the dealer would also be punched out as shown in Fig. 21. Sections A, B and 1 would not be perforated, and sections 2 to 7, incl., and 9 to 16, incl., would not be perforated. If the report set up in the analyzer and represented by the pins 5 and 5′ of the analyzer (see Figs. 3 and 4) was such with the dealer under consideration would like to have it, the pins of the analyzer would pass through the perforations in sections $y$ and $z$ of his card and thus cause the machine to function so that one of the printed report slips would have this dealer's number stenciled thereon. If this report included information concerning ornamental iron required for schoolhouses within this dealer's territory and of the valuation required by him, but having exterior walls other than those specified by this dealer for example, as represented by a pin in the hole 201 (see Fig. 3), all the pins of the analyzer, with the exception of this pin in section J, would register with the perforations in our dealer's card. Since this pin in section J would not register with any perforation, the section Y of the analyzer would be lifted up by this pin and, as explained above, the dealer's card would pass out of the machine without causing his number to be stenciled on one of the report slips.

If a second dealer requested the same information desired by the dealer just considered and in addition expressed a desire to have all information concerning projects (i. e. buildings under construction) requiring ornamental iron provided the buildings were in his territory, even though the building was something other than the schoolhouse, his card would be punched the same as that of the dealer just considered, except that the dealer's territory and specified valuation would be punched out in the sections A and B, as well as in sections C and D. Therefore, if a report was such that the pins in sections Z and Y registered with the perforations in section $z$ and $y$ of the second dealer's card, his number would be stenciled on one of the report slips; and if all of the pins in sections Z and W registered with the perforations in sections $z$ and $w$ of this dealer's card, his number would be stenciled on one of the report slips. For this reason, when a report is being set up on the analyzer, the territory and valuation settings in section Y are duplicated in section W, as shown in Fig. 3.

Likewise, if a dealer asked for reports concerning schoolhouses in his territory and having a certain type of exterior wall, provided the schoolhouses were in a certain condition or stage of construction or provided ornamental iron was to be used on the schoolhouses, his card would have sections Y and Z, and 8 punched in the manner above described, and the condition specified would be punched in section $x$. This dealer would then receive all reports giving information in accordance with his requirement as to territory, project, exterior walls and ornamental iron, regardless of the condition or stage of construction, for the pins representing these reports would register with these perforations in sections $z$ and $y$ of his card. He would also receive all reports meeting his requirements in regard to the territory, project, exterior walls and condition, regardless of whether or not they include information relative to ornamental iron, for the pins of these reports would register with the perforations in sections $x$ and $y$ of his card.

By referring to Figs. 1 and 2 it may be noted that the improved machine provides a means whereby a report strip 7 may be passed through the machine and means whereby the report may be printed on this strip which is subsequently cut up to form slips which may be sent out to the clients. The report strip 7 is fed from a roll 54, passes through printing devices 56 and 64 which may be of any suitable type, passes in close proximity to the analyzing device so that the index numbers on the record cards may be stencilled thereon, then passes to the knife 69 which severs the strip and the resulting slips fall into the receptacle 130. The record cards pass from the card receptacle 2 into the analyzer and from the analyzer they pass under the stenciling roll 9 and on into the receptacle 65.

It is to be understood that the size, arrangement and combination of the various parts of this invention may be varied without departing from the principle of the invention which is not confined to the particular embodiments shown and described, but is intended to include such modifications thereof as fall within the scope of the appended claims. The timing of the various events in the operation of the machine may be varied as desired. Furthermore, it is to be understood that printing rolls, or other suitable devices may be used in place of the particular printing devices shown in the drawings. The analyzer is adapted to operate any recording device and its use is therefore not confined to the operation of the stencilling roll 9. The term "adjusting" as used in this specification in connection with the analyzer mechanism, is intended to define the function of any analyzer section other than the sections Z or X, in determining the ultimate position of the upright arms 24. A pin in section Z registering with the perforation in the card will cause both of these arms to be moved to their vertical positions and the subsequent analysis of the remaining portion of the card by analyzer sections W and Y determines whether one or both of these arms are to remain in their vertical positions or are to be returned to their inoperative positions.

I claim:

1. In a machine of the type described, means for actuating a recording device, an analyzer section, mechanism connecting the analyzer section with the means for actuating a recording device, the said analyzer section being adapted to receive a plurality of pins, and the analyzer section and the said connecting mechanism being arranged so that any one of several pins in the analyzer, which registers with a perforation in a card, may actuate said mechanism to place said means in operative position.

2. In a machine of the type described, means including two independent members, for actuating a recording device, and two analyzer sections adapted to receive a plurality of pins for placing said actuating means in operative position, one of said sections being adapted to move both of said independent members, and the other section to move only one of the members.

3. In a machine of the type described, means for actuating a recording device, an analyzer section adapted to receive a plurality of pins and arranged so that any pin registering with a perforation in a card may place said means in operative position, and a second analyzer section adapted to receive a plurality of pins and arranged so that any pin therein not registering with a perforation in the card will tend to return said means to its inoperative position.

4. In a machine of the type described, means including two independent members, for actuating a recording device, an analyzer section adapted to receive a plurality of pins and arranged so that any pin therein registering with a perforation in a card may move both of said members to their operative positions to place said actuating means in operative position, and two additonal analyzer sections each adapted to receive a plurality of pins and arranged so that any pin in one of said additional sections not registering with a perforation in the card will tend to return one of said independent members to its inoperative position, and any pin in the other additional section not registering with a perforation in the card will tend to return the other of said independent members to its inoperative position.

5. In a machine of the type described, means, including two independent members, for actuating a recording device, a plurality of analyzer sections each adapted to receive a plurality of pins, means associated with one section whereby any pin therein registering with a perforation in a card may place both of said members in operative position, means associated with a second section whereby any pin therein registering with a perforation in the card will tend to place one of said members in operative position, means associated with a third section whereby any pin therein not registering with a perforation in the card will tend to return one of said members to its inoperative position, and means associated with a fourth section whereby any pin therein not registering with a perforation in the card will tend to return the other of said members to its inoperative position.

6. In a machine of the type described, an analyzer comprising means for analyzing a portion of a record card and for setting a recording device so that it may operate, and means for subsequently analyzing the remainder of the card and for adjusting the setting of the recording device accordingly.

7. In a machine of the type described, means for actuating a recording device, said means comprising a lever for imparting motion to the recording device, a member adapted to be placed in operative position by the analyzer of the machine, and a link associated with said member and adapted to render said lever effective to operate said device when said member is in its operative position.

8. In a machine of the type described, means for actuating a recording device, said means comprising a lever for imparting motion to the recording device, two independent members adapted to be placed in operative position by the analyzer of the machine, and a link associated with each of said members, said links being arranged so that either of them may render said lever effective to operate said device when the corresponding member is in its operative position.

9. In a machine of the type described, an analyzer, means for feeding cards to the analyzer, means for feeding a strip of paper, means for printing matter on said strip, and means for reproducing on said printed strip index characters on certain of said cards.

10. In a machine of the type described, an analyzer, means for feeding cards to the analyzer, means for feeding a strip of paper, means for printing a definite length of said strip, means for reproducing on said strip index characters on certain of said cards, and means for advancing said strip one length for each time the reproducing means operates.

11. In a machine of the type described, an analyzer, means for feeding cards to the analyzer, means for feeding a strip of paper, means for printing a definite length of said strip, means for reproducing on said strip index characters on certain of said cards, and means for advancing said strip one length and for causing the printing means to print one length for each time the reproducing means operates.

12. In a machine of the type described, an analyzer, means for feeding cards to the analyzer, means for supplying a continuous strip of paper, means for reproducing on said strip index characters on certain of said cards, and means for advancing a definite length of said strip each time said reproducing means operates.

13. In a machine of the type described, an analyzer, means for feeding cards to the analyzer, means for supplying a strip of paper, means for reproducing on said strip index characters on certain of said cards, means for advancing a definite length of said strip each time said reproducing means operates, and means for cutting said strip each time said reproducing means operates, whereby slips bearing said index characters are formed.

14. In a machine of the type described, an analyzer, means for feeding cards to the analyzer, means for feeding a strip of paper, means for printing matter on both sides of said strip, and means for reproducing on said printed strip index characters on certain of said cards.

15. In a machine of the type described, means adapted to advance a strip of paper at regular intervals, a clutch associated with said means, means adapted to hold said clutch open during the period when said first named means is not operating, and additional means capable of holding said clutch open during the period when said first named means is operating.

16. In a machine of the type described, means adapted to advance a strip of paper at regular intervals, a clutch associated with said means, means adapted to hold said clutch open during the period when said first named means is not operating, and additional means capable of holding said clutch open during the period when said first named means is operating, said last named means being controlled by mechanism associated with the analyzer.

17. In a machine of the type described, an analyzer, means for feeding cards to the analyzer, means for feeding a strip of paper, means for reproducing on said strip index characters on certain of said cards, means for advancing said strip by definite increments, and means for preventing said advancement except when said reproducing means operates.

In testimony whereof I affix my signature.

ROBERT B. RICE.